United States Patent Office 2,797,609
Patented July 2, 1957

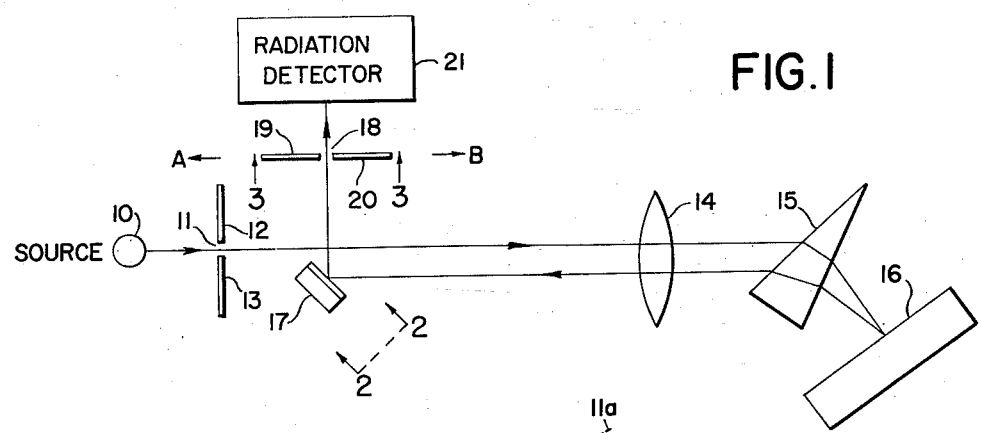
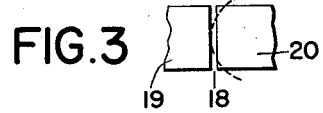
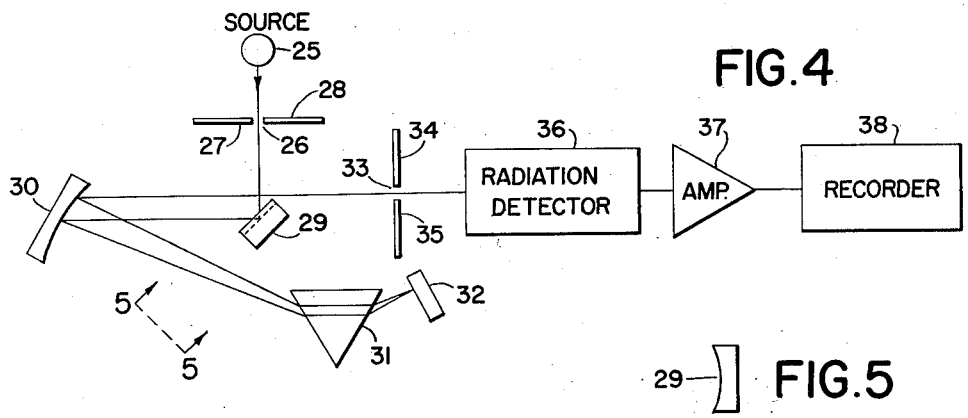
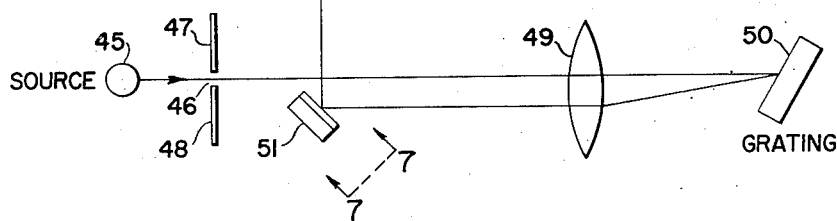
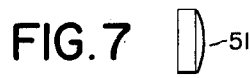

2,797,609

APPARATUS FOR CORRECTING FOR IMAGE CURVATURE IN MONOCHROMATORS

John U. White, Darien, Conn., assignor to The White Development Corporation, Stamford, Conn., a corporation of Connecticut Application January 24, 1955, Serial No. 483,763

2 Claims. (Cl. 88—14)

This invention relates to apparatus for selecting and measuring the distribution of intensity of radiation in a spectrum.

The types of apparatus to which the invention is applicable includes spectrographs, spectrometers, spectrophotometers and monochromators.

Monochromators, which will be referred to for purposes of illustrating the invention, usually include an entrance slit, for admitting light from a source of radiation, a collimator, such as a lens or mirror, a dispersing element such as a prism or diffraction grating, and an exit slit. (In the present description and claims, it will be understood the term "light" is not restricted to visible light, but may include radiation having wavelengths longer or shorter than the visible spectrum.) Light entering through the entrance slit is passed along a path including the collimator and the dispersing element, is dispersed into a spectrum by the dispersing element, and a dispersed image of the entrance slit is formed in the region of the exit slit, so that by positioning the exit slit one may allow a selected, almost monochromatic portion of the entering light to emerge through the exit slit. The entrance and exit slits are usually formed by movable, spaced-apart jaws, adapted to vary the width of the slits.

One of the difficulties in the design and construction of monochromators is the effect known as curvature of image, caused by the action of the dispering prism or grating, and by other factors. More particularly, this effect is such that if a straight entrance slit is used in the monochromator, its image at the exit slit is curved. If, with such a curved image, a straight exit slit were used, the results would be undesirable, because the light emerging through the exit slit would not be monochromatic. Heretofore, efforts to overcome this difficulty have led to the use of a curved slit, having the same curvature as the image of the entrance slit, so that the emerging light would be monochromatic, that is, would have the same wavelength all along the exit slit.

The arrangement using a curved slit has disadvantages, for example:

(a) It requires the construction of curved slit jaws, and this is much more difficult than the construction of straight jaws.

(b) The curved slit arrangement is not satisfactory in instances in which it is desired to use a straight narrow source of radiation and a straight narrow detector, in combination.

(c) In certain arrangements it is desired that the monochromator be adjustable so that it can vary the number of traversals or passes of the light along that portion of the path including the dispersing element. When the number of traversals varies, the amount of curvature of the image of the entrance slit varies. In arrangements using a curved exit slit, it is very difficult to change the slit curvature so as to match the image curvature resulting from different numbers of traversals or passes of the light.

An object of the invention is to correct for the above-mentioned curvature of image of the entrance slit.

In one embodiment of the apparatus of the present invention, a straight entrance slit and a straight exit slit are used, and at a point in the light path lying between them there is placed a cylindrical mirror which diminishes or eliminates the above-mentioned curvature from the image of the entrance slit. With this arrangement it is possible to avoid the disadvantages of curved slits enumerated above, and also to avoid the production of a curved image in the region of the exit slit.

The above-mentioned, and other, features and objects obtainable by the practice of the present invention will be readily comprehended by persons skilled in the art by reference to the following detailed description taken in connection with the annexed drawings which describe and illustrate a preferred embodiment of the invention and wherein Figure 1 is a schematic plan view illustrating a monochromator of a type employing a prism, and including a cylindrical mirror.

Figure 2 is a side elevational view at the position 2—2 as indicated in Fig. 1, showing the shape of the convex cylindrical mirror of Fig. 1.

Figure 3 is a fragmentary elevational view of the jaws forming the exit slit in Fig. 1 looking in the direction the light is going, and shows the curvature of the image of the entrance slit which would occur in the absence of means for correcting for this curvature.

Figure 4 is a schematic plan view of another type of monochromator, using a concave cylindrical mirror for correcting for curvature of the image of the entrance slit.

Figure 5 is an elevational view, at the position 5—5 in Fig. 4, showing the shape of the concave cylindrical mirror of Fig. 4.

Figure 6 is a schematic plan view of still another type of monochromator, including a diffraction grating, and including a convex cylindrical mirror for correcting for curvature of the image of the entrance slit.

Figure 7 is an elevational view taken at the position 7—7 of Fig. 6 showing the shape of the convex cylindrical mirror of Fig. 6.

In the illustrative form of the invention shown in Figs. 1 and 2, there is provided a source 10 of radiation, and light from this source passes through a straight entrance slit 11 formed by jaws 12 and 13, and then along a path including a lens 14, a prism 15, and a plane mirror 16, and is then reflected by the mirror 16 back through the prism 15 and the lens 14. The light thereafter strikes the convex surface of a cylindrical mirror 17, and then passes through a straight exit slit 18 formed by jaws 19 and 20, and then strikes a radiation detector 21. An image of the entrance slit 11 is formed in the region of the exit slit 18, and if it were not for the correcting effect of the cylindrical mirror 17, the shape of the image in the region of the exit slit would be curved, as shown by the dotted line 11a in Fig. 3. The cylindrical mirror 17, however, partially or entirely eliminates the curvature of this image. As a result, there may be produced at the exit slit an image of the entrance slit which is straight. This has the advantage that a straight entrance slit may be used in combination with a straight exit slit, and yet the image of the entrance slit will have the same wavelength all along the exit slit, as is usually desired. The radiation detector 21 may, in certain embodiments, comprise means for producing an electrical response related to the radiation which it receives, for example, a thermocouple or photoelectric cell. In other embodiments the radiation detector might comprise photographic means, such as a light sensitive film or plate.

In the arrangement of Fig. 4, light from a source 25 passes through an entrance slit 26 formed by jaws 27 and 28, strikes the concave surface of a cylindrical mirror 29, is then reflected by a focusing mirror 30 through a prism 31, thereafter strikes a plane mirror 32, and is reflected back along a path including the prism 31, and the mirror 30, and an image of the entrance slit is then formed in the region of an exit slit 33 between jaws 34 and 35. Light emerging from the exit slit 33 then strikes a radiation detector 36, such as a thermocouple. The radiation detector produces an electrical response, which is applied to an amplifier 37, connected to a recorder such as a recording voltmeter 38.

In the embodiment of Fig. 6, light from a source 45 enters the apparatus through a straight entrance slit 46 formed by jaws 47 and 48, and then passes along a path including a lens 49, a diffraction grating 50, the lens 49 again, the convex surface of a cylindrical mirror 51, and then emerges through an exit slit 52 formed by jaws 53 and 54. It may be assumed in Fig. 6, as in the other figures, that the entrance slit and exit slit are straight.

Although the cylindrical mirror is shown in the drawings with its axis at an angle of 45 degrees to the light incident on the mirror, and there are certain advantages to this arrangement, it need not necessarily be set at that angle. The axis of the mirror must, however, be at an oblique angle to the incident light, that is, at an angle other than a right angle. Moreover, the axis of the mirror should preferably be positioned so as to intersect the path (if extended) of a central or axial ray of the incident light.

In the various illustrative embodiments described herein, the curvature of the reflecting surface of the cylindrical mirror will be sufficient to diminish materially, or eliminate, the curvature of the image of the entrance slit formed in the region of the exit slit. In the absence of other complicating factors, it is usually preferable to eliminate this curvature entirely. Sometimes, however, in practice, there are other complicating factors of such a nature that the over-all optimum condition will represent a compromise in which the cylindrical mirror materially diminishes, but does not completely eliminate, the curvature of the image of the entrance slit.

For completely eliminating the curvature of the entrance slit in the illustrative arrangements shown in Figures 1, 4, and 6, the curve in the cylindrical mirror, assuming that the mirror is set at 45 degrees to the path of the light striking it, should be such that its sagitta is 0.707 time the sagitta of the curve in the spectral line of the incident light, when the cylindrical mirror is very close to the exit slit. When the cylindrical mirror is appreciably distant from the exit slit, its sagitta must be larger. For example, with an optical system having a nominal slit length of 1½ inches and in which the cylindrical mirror is 1⅛ inches from the exit slit and inclined at an angle of 45 degrees to light incident on it, the proper sagitta for the cylindrical mirror is .057 millimeter when the corresponding sagitta of the curve in the spectral line is 0.066 millimeters. In this particular illustration the sagitta of the cylindrical mirror, 0.057 millimeter, is 0.86 time the sagitta of the curve in the spectral line, 0.066 millimeter.

In the foregoing, it will be understood that the term "sagitta" refers to the line of maximum length which may be drawn from an arc, perpendicular its chord. With respect to the cylindrical mirror, the chord in question is drawn between those points on the mirror where the ends of the image of the entrance slit strike the mirror; and the sagitta is drawn from that chord to the adjacent arc formed by the surface of the mirror (in cross section). With respect to the spectral line, the chord is drawn between the ends of the curved image of the entrance slit which would be formed in the region of the exit slit in the absence of the use of the cylindrical mirror for preventing this curvature; and the sagitta is drawn between this chord and the arc representing the curved image.

The present invention is useful not only in arrangements in which the light makes a single trip through the dispersing element, but also in multipass arrangements in which the light makes one, two or more round trips through the dispersing element. Certain such multipass arrangements are illustrated, for example, in Walsh Patent 2,652,742. In some monochromators it is desirable to be able to adjust the arrangement so that the light will, for different adjustments, make different numbers of traversals or passes. Depending upon the number of traversals, however, the curvature of the image of the entrance slit in the region of the exit slit will tend to vary, being greater for adjustments giving more traversals. In arrangements using a straight entrance slit and a curved exit slit, it is very awkward, upon readjusting the apparatus so as to vary the number of traversals, to change the curvature of the exit slit to match the changed curvature of the image. With the arrangement of the present invention, a single straight exit slit may be used, without change when the apparatus is readjusted for a different number of traversals, and it is merely necessary to change the cylindrical mirror. That is, a series of mirrors is employed, each one being applicable for a particular number of traversals of the light through the apparatus. It is thus possible to reduce the image curvature to zero, or to make it the same after different numbers of traversals of light through the apparatus.

When the collimator of the monochromator also introduces image curvature, in addition to that introduced by the dispersing element, this can also be taken account of in the choice of the radius of the cylindrical mirror, which should be of such a value to correct for the curvature of image caused by both.

While a suitable form of apparatus to be used in accordance with the invention has been described in some detail, and certain modifications have been suggested, it will be understood that numerous changes may be made without departing from the general principles and scope of the invention.

I claim:

1. In apparatus for selecting a portion of a spectrum, in combination, a straight entrance slit, for admitting radiation from a source, a straight exit slit, and means for directing radiation entering through said entrance slit along a path to form an image of said entrance slit at said exit slit, said means including a collimator, a dispersing element, and a cylindrical mirror positioned in the path of said radiation passing from said entrance slit to said exit slit, the axis of said mirror being at an angle other than a right angle to the path of the said radiation striking it, said dispersing element tending to produce transverse curvature of said image, but said cylindrical mirror being curved in a direction to diminish materially said curvature of said image.

2. In apparatus for selecting a portion of a spectrum, in combination, an entrance slit for admitting light, an exit slit, and a collimator, a dispersing element and a cylindrical mirror for directing light entering through said entrance slit along a path to form an image of said entrance slit at said exit slit, said dispersing element tending to produce curvature of said image, but said cylindrical mirror being oriented with its axis at an oblique angle to said path and being curved in a direction to eliminate said curvature of said image, said cylindrical mirror being set with its axis at an angle of 45° to the light striking said mirror, and the sagitta of the curve of said cylindrical mirror being at least as great as 0.707 times the sagitta of the curve in the spectral line of said light.

References Cited in the file of this patent

UNITED STATES PATENTS

| | | |
|---|---|---|
| 2,443,258 | Lindenblad | June 15, 1948 |
| 2,669,899 | Macleish | Feb. 23, 1954 |

FOREIGN PATENTS

| | | |
|---|---|---|
| 1,008,105 | France | Feb. 13, 1952 |